J. A. BURRELL.
FIFTH WHEEL.
APPLICATION FILED FEB. 3, 1909.
936,983.
Patented Oct. 12, 1909.
2 SHEETS—SHEET 2.
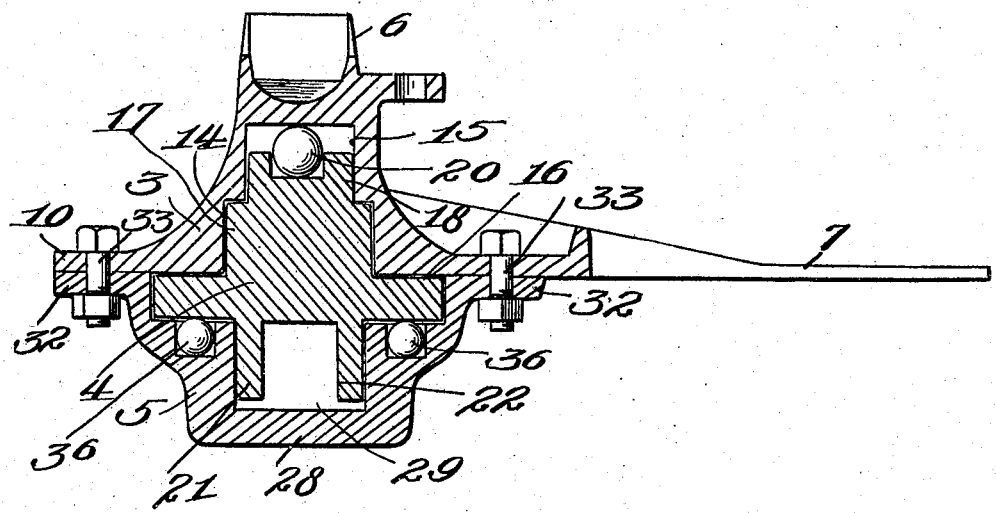
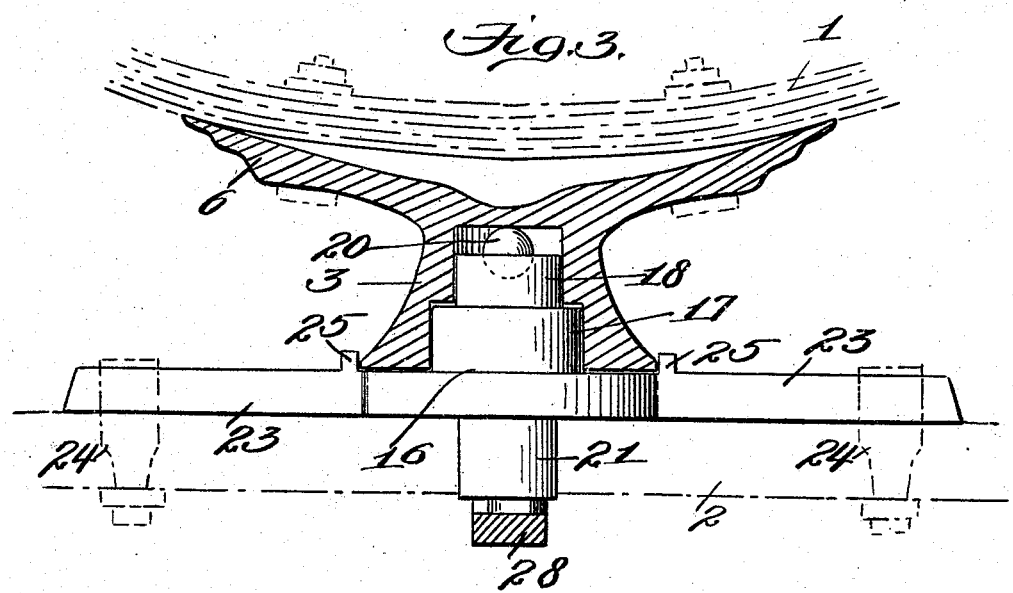
Witnesses:
Inventor
Jonas Arnold Burrell
By
James L. Norris
Atty.

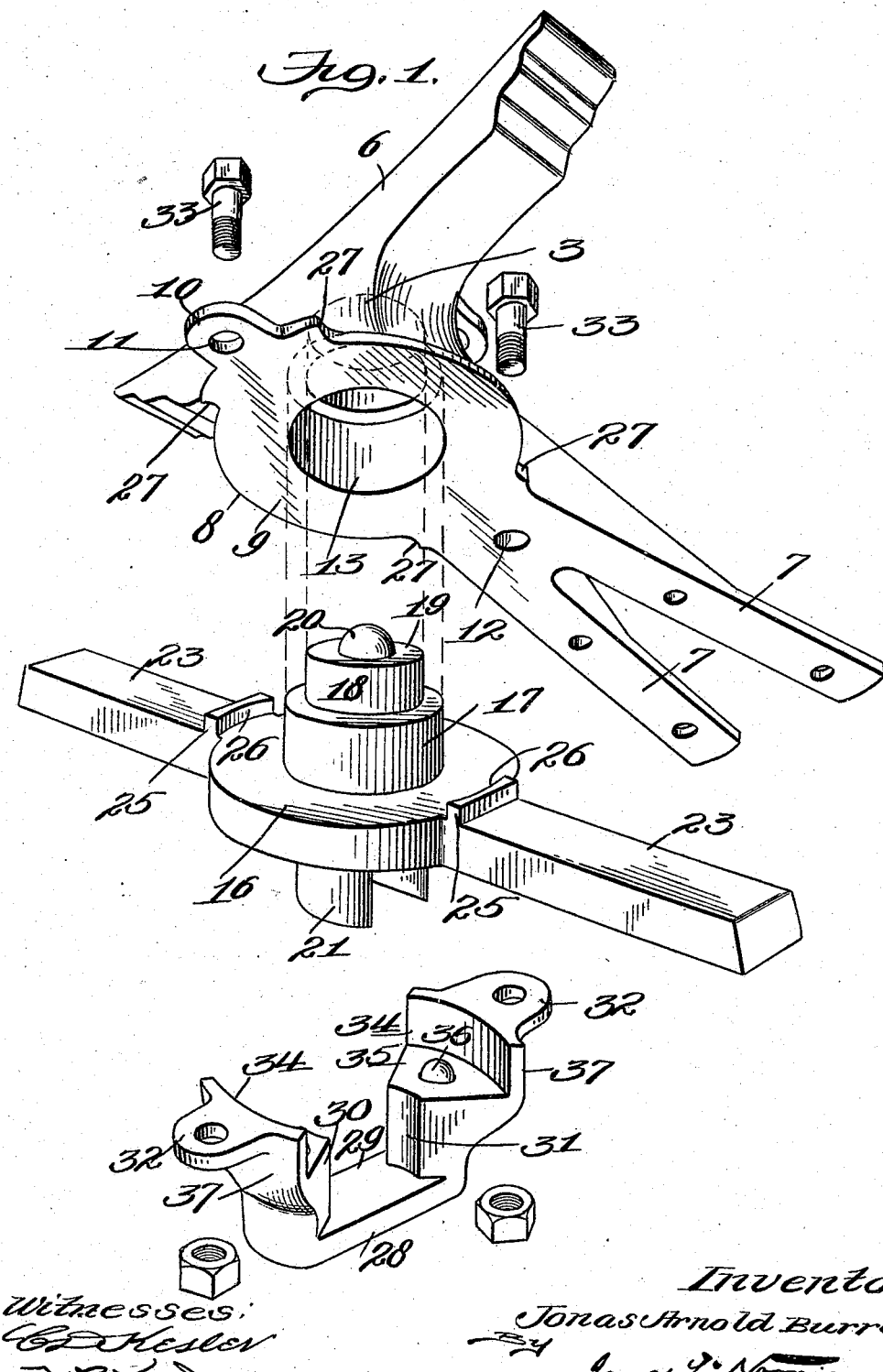

UNITED STATES PATENT OFFICE.

JONAS ARNOLD BURRELL, OF JOHNSTOWN, PENNSYLVANIA, ASSIGNOR TO NANCY C. BOWMAN, OF JOHNSTOWN, PENNSYLVANIA.

FIFTH-WHEEL.

936,983.  Specification of Letters Patent.  Patented Oct. 12, 1909.

Application filed February 3, 1909. Serial No. 475,805.

*To all whom it may concern:*

Be it known that I, JONAS ARNOLD BURRELL, a citizen of the United States, residing at Johnstown, in the county of Cambria and State of Pennsylvania, have invented new and useful Improvements in Fifth-Wheels, of which the following is a specification.

This invention relates to fifth wheels or fifth wheel couplings for vehicles, and the primary object of the same is to provide an improved device of this class embodying ball and socket structural features to reduce the friction to a minimum and by means of which the front axle of the vehicle may be freely turned within prescribed limits and the vehicle turned or cramped or manipulated in the usual manner.

A further object of the invention is to provide a fifth wheel or fifth wheel coupling of the class specified wherein all tendency to rocking movement of the several parts or of the socket member in relation to the companion ball carrying member will be obviated owing to the interposition of a bearing element carried by one member and coöperating with the remaining member.

A further object of the invention is to provide a fifth wheel or fifth wheel coupling of the class specified wherein the moving parts are inclosed and protected in such manner that dust, dirt and other foreign substances cannot enter or collect therein.

A still further object of the invention is to provide a fifth wheel or fifth wheel coupling of a strong and durable nature and wherein the parts may be readily associated and applied with coöperating elements of the vehicle at a comparatively small cost.

With these and other objects and advantages in view, the invention consists in the construction and arrangement of the several parts which will be more fully hereinafter specified.

In the drawings: Figure 1 is a perspective view of a fifth wheel or fifth wheel coupling embodying the features of the invention and showing the parts dissociated. Fig. 2 is a longitudinal section through the parts of the fifth wheel or coupling in associated relation. Fig. 3 is a transverse section through the fifth wheel or coupling in associated relation and illustrating a spring applied to the front bolster and a portion of the axle engaging the turning or fulcrum member of the wheel or coupling.

The numeral 1, Fig. 3, designates a portion of a spring, and 2 a part of an axle, the spring and axle being of the usual form.

The fifth wheel or coupling embodies in its organization three essential elements, namely, an upper or socket member 3, a ball or fulcrum member 4, and an assembling clip 5.

The upper or socket member 3 has a front bolster 6 integrally formed therewith and rearwardly extending divergent hound attaching arms 7 which are applied in a manner which will be readily understood to connect up the running gear of the vehicle to the fifth wheel or coupling. The spring 1 is applied to or seated on the bolster 6, as shown by Fig. 3, the upper surface of the bolster being shaped for this purpose. The lower portion of the member 3 is in the form of an approximately circular rest or base 8 having a flat face 9, and therefrom extends a forward ear 10 which is suitably apertured as at 11, the aperture 11 being in longitudinal alinement with an aperture 12 for a purpose which will be hereinafter explained. The socket 13 opens through the center of the base 8, said socket having a lower diametrically enlarged portion 14 continuing into an upper smaller extension 15.

The fulcrum member 4 embodies an approximately circular table 16 having a cylindrical center post 17 projecting upwardly therefrom and formed with an upwardly reduced extremity 18, the upper end of the reduced extremity of the post having a ball seat 19 formed in the center thereof to receive a ball 20. The center post 17 is of the same contour as the socket 13, but the upper reduced extremity 18 of said post is of less length than the extension 15 of the socket and the ball 20 seated in the said extremity contacts with the top wall of said socket extension, as shown by Figs. 2 and 3. Depending from the under side of the table 16 is a bifurcated post 21, the bifurcation 22 of this post having parallel side walls and a top wall at right angles to the said side walls for insertion therethrough of the axle 2. It is obvious that the shape of the bifurcation 22 might be modified to correspond to the shape of the axle inserted therethrough, but aside from the particular shape of the bifurcation and axle it is essential that the association of the axle with the post 21 should be such that the fulcrum member 4 will be readily turned in response to the swing of the axle in opposite directions in turning or cramping a vehicle. The fulcrum member also has attaching arms 23 extending outwardly therefrom equally in opposite directions and preferably formed as a part of the table 16 to bear upon the axle 2, suitable clips 24, as shown by dotted lines in Fig. 3, being used to secure the fulcrum member through the medium of the arms 23 to the axle. The arms 23 have at their inner portions adjacent to the table 16 upwardly projecting stop lugs 25 with inner concaved faces 26, the said faces being curved longitudinally in planes parallel with the periphery of the said table and the base 8 of the socket member 3, the said base 8 having oppositely disposed pairs of shoulders 27 for contact with the opposite ends of the respective lugs 25 to limit the swing of the axle in opposite directions under the body of the vehicle.

The clip member 5 has a central drop 28 in which is formed a seat 29 with front and rear segmental walls 30 having their inner reduced extremities concaved as at 31 to form bearing surfaces for the outer convex faces of the members of the bifurcated post 21 of the fulcrum member 4. The clip member 5 when applied is secured through the medium of apertured ears 32 against the ear 10 and opening 12 of the socket member 3 by nutted bolts or analogous fastenings 33. The segmental walls 30 of the seat 29 are recessed as it 34 to particularly provide horizontal bearing ledges 35 in which balls 36 are seated, one ball in each ledge, as clearly shown in Figs. 1 and 2. The segmental walls 30 are continued above the ledges 35 in the form of concavo-convex vertical extensions 37, and from the upper terminals of the latter the ears 32 project in planes at right angles.

In associating the several parts of the fifth wheel or coupling, the socket member 3 is first applied and secured, the fulcrum member 4 then fitted upwardly in the socket member so that the post 17 will be located within the socket 13 and the ball 20 in contact with the top wall of the socket extension 15, and the clip member 5 is finally applied over the lower portion of the fulcrum member and secured to the socket member. When the parts have been thus assembled the bifurcated post will project downwardly into the seat 29 of the clip member with the lower terminal of said post above the bottom of the seat, and the table 16 bears on the balls 36 so that the said fulcrum member is held out of frictional contact with relation to the coöperating parts of the socket and clip members. It will be understood that prior to the application of the clip member 5 the axle 2 will be seated in the bifurcation 22 of the post 21 and when the said clip member is secured to the socket member, as shown by Figs. 2 and 3, the said axle will be confined between the clip member and fulcrum member and free to operate the said fulcrum member or be frictionally relieved when swung in opposite directions in accordance with the turning movement of the vehicle by the said fulcrum member in view of the particular application of the latter member and the balls 20 and 36 coacting therewith.

It will be seen that the table 16 of the fulcrum member not only effectively contributes to the sensitive operation of the said fulcrum member, but obstructs sagging of this member, particularly after the parts of the fifth wheel or coupling become worn from use in view of the engagement of said table with the balls 36, and in the event that these balls wear down the usefulness of the fulcrum member and its effectiveness in performing the function for which it is used will not be wholly impaired as the ledges 35 will prevent material irregular position of the said fulcrum member in the event that said table contacts with the ledges. The fulcrum member is also inclosed, to a large extent, and dust and grit will have very little effect on its operation, as it will be difficult for dust or grit to enter between the fulcrum member and the coöperating members and particularly between the center post 17 and the socket member. Owing to the use of the clip member 5 the fulcrum member may be very readily associated with the socket member and the axle disposed in operative relation to the said fulcrum member, and if repair becomes necessary the clip member can be very easily detached and the fulcrum member removed without dissociating the socket member from the parts with which it has supporting coöperation. A further advantage of the improved form of fifth wheel or coupling is that it may be readily applied to vehicles now in use.

The general construction of the fifth wheel or coupling as hereinbefore described is strong and the parts will resist considerable wear and tear, and, further, the proportions of the several parts are reduced to a minimum and are compact in form.

What is claimed is:

1. A fifth wheel for a vehicle comprising a socket member, a fulcrum member having an upwardly projecting center post movably fitted in the socket member and provided with an antifrictional device at its upper extremity to engage the upper portion of the socket member and also having a table with a depending bifurcated post, and a clip member secured to the socket member and having a central seat into which the bifurcated post extends and also formed with ledges carrying antifrictional devices on which the table has bearing.

2. A fifth wheel for vehicles comprising a socket member, a fulcrum member for securement to an axle, the said fulcrum member being provided with an upwardly projecting center post movably fitted in the socket member and having an antifrictional device at its upper extremity to bear against the upper portion of the socket member and also having a table with a depending bifurcated post to receive the vehicle axle, and a clip member having a seat into which the bifurcated post extends and ledges on which the table movably bears.

3. A fifth wheel comprising a socket member, a fulcrum member for securement to an axle, the fulcrum member being provided with an upwardly projecting center post movably fitted in the socket member and also having a table with a depending bifurcated post to fit over the vehicle axle, and a clip member having a seat into which the bifurcated post extends and ledges over which the table has movement.

In testimony whereof I have hereunto set my hand in presence of two subscribing witnesses.

JONAS ARNOLD BURRELL.

Witnesses:
E. G. KERR,
ALEX. N. HART.